(No Model.)
L. BURK, Dec'd.
C. Burk, Administrator.
CULTIVATOR TOOTH.
No. 336,508. Patented Feb. 16, 1886.
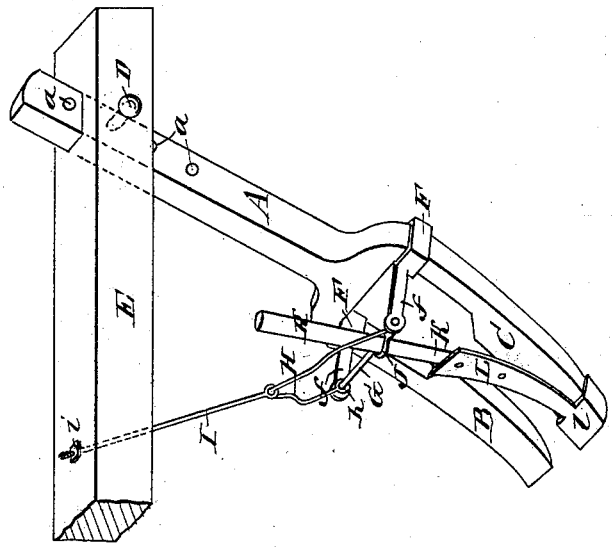
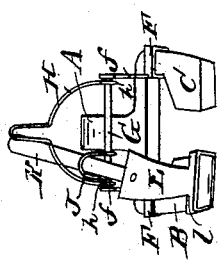
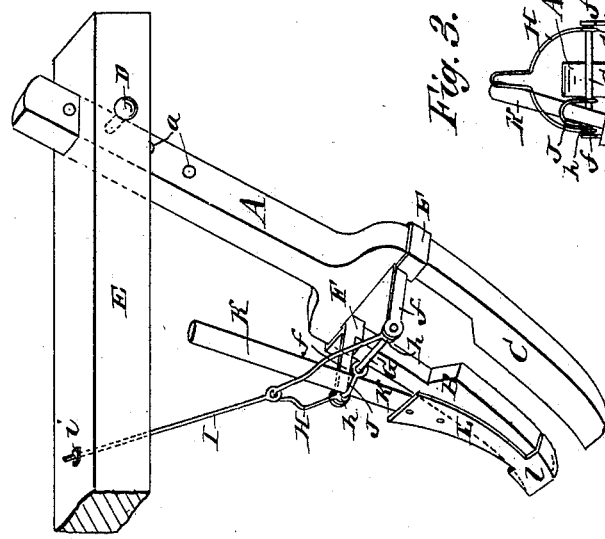
WITNESSES:
INVENTOR:
L. Burk
BY Munn & Co
ATTORNEYS.

UNITED STATES PATENT OFFICE.

LEANDER BURK, OF WHITE CLOUD; CHARLES BURK, OF WILCOX, NEWAYGO COUNTY, MICH., ADMINISTRATOR OF SAID LEANDER BURK, DECEASED.

CULTIVATOR-TOOTH.

SPECIFICATION forming part of Letters Patent No. 336,508, dated February 16, 1886.

Application filed November 25, 1884. Serial No. 148,819. (No model.)

*To all whom it may concern:*

Be it known that I, LEANDER BURK, of White Cloud, in the county of Newaygo and State of Michigan, have invented a new and Improved Cultivator-Tooth, of which the following is a full, clear, and exact description.

My invention has for its object to provide a cultivator-tooth adapted for use in cultivating ordinary crops, and for ridging the earth over the seed in planting crops.

The invention consists in a cultivator-tooth formed with two prongs at its lower end, and a mold-board adapted to either prong.

The invention consists, also, in particular constructions and combinations of devices for supporting the mold-board on the tooth and allowing its adjustment to either of the prongs of the tooth, all as hereinafter fully described and claimed.

Reference is to be had to the accompanying drawings, forming part of this specification, in which similar letters of reference indicate corresponding parts in all the figures.

Figure 1 is a perspective view of my improved cultivator-tooth with the reversible mold-board adjusted to the right-hand prong of the tooth, and showing a part of the cultivator-beam. Fig. 2 is a like view with the mold-board adjusted to the left-hand prong of the tooth, and Fig. 3 is an end view of the tooth.

The tooth is made with a standard or bar, A, and right and left prongs, B C, branching from the lower end of the standard, which has or may have a series of holes, $a$, in its upper part to receive a pin, D, passed through the cultivator bar or beam E through any one of the holes, for holding the tooth at any desired height on the beam for working deeper or shallower in the ground. The upper faces of the prongs B C incline downward toward their inner edges, as indicated in Fig. 3, so that the prongs have a tendency to throw the earth inward from each side toward the space between them.

To the upper parts of the prongs B C are fixed the clips F F, which have projecting arms $ff$, which are connected by a bar, G, to which any suitable brace or yoke, H, is attached in any approved way, as by eyes $h\ h$ of the yoke encircling the bar G, and the yoke is connected by a brace-rod, I, and nut $i$ with the cultivator-beam E.

On the bar G is placed loosely a half-loop, J, or it may be a ring, through which the shank or bar K is passed loosely, and the bar K carries at its lower end the mold-board or plate L, which has fixed at its lower end a clip, $l$, which fits the upper surface and opposite undercut edges of the tapered lower ends of either of the prongs B C, so that the bar K and loop J may be slid to either end of the bar G, to allow the clip $l$ to be drawn upward by the bar K until the clip binds on the end of the right-hand prong, B, as in Fig. 1, to cause the mold-board L to throw the soil to the left, or to allow the clip $l$ to be placed in like manner on the end of the left-hand prong, C, to cause the mold-board to throw the soil to the right, and the mold-board may be removed from the tooth at any time.

In cultivating corn or potatoes or other crops the mold-board L will be removed from the cultivator-teeth, which will by their prongs remove the weedy growths, and in seeding or planting crops the mold-board will be applied to either of the prongs B C of the cultivator-teeth, as the roll or slope of the land or other circumstances may require, to ridge the soil evenly over the seed dropped in the furrow made by the opening-plow.

My improved cultivator-teeth may be attached in any required number to frames of any suitable design or size, depending on the work to be done.

Having thus described my invention, what I claim as new, and desire to secure by Letters Patent, is—

1. A cultivator-tooth made with a standard, A, having end prongs, B C, in combination with a mold-board, L, having a clip, $l$, fitting the end of either prong, substantially as herein set forth.

2. A cultivator-tooth made with a standard, A, having prongs B C, clips F $f$, held to the prongs and connected by a rod, G, and a mold-board, L, having a clip, $l$, adapted to the prongs and provided with a bar, K, which passes loosely through a yoke, J, placed loosely on the rod G, substantially as herein set forth.

3. A cultivator-tooth made with a standard, A, having prongs B C, clips F f, rod G, moldboard L l, bar K, and yoke J, arranged substantially as specified, in combination with the yoke H and a brace-rod connecting the tooth to the cultivator-beam, substantially as herein set forth.

LEANDER BURK.

Witnesses:
DANIEL O'SULLIVAN,
JACOB COHN.